United States Patent [19]

Fowler

[11] Patent Number: 4,913,952

[45] Date of Patent: Apr. 3, 1990

[54] CARPET COMPOSITES, HAVING IMPROVED STATIC ELECTRICITY CHARACTERISTICS

[75] Inventor: James E. Fowler, Spartanburg, S.C.

[73] Assignee: Milliken Research Corporation, Spartanburg, S.C.

[21] Appl. No.: 270,875

[22] Filed: Nov. 14, 1988

[51] Int. Cl.[4] ................................ B32B 3/02

[52] U.S. Cl. ................................ 428/87; 428/90; 428/95; 428/408; 428/323

[58] Field of Search ................ 428/87, 90, 95, 97, 428/367, 408, 323

[56] References Cited

U.S. PATENT DOCUMENTS

| | | | |
|---|---|---|---|
| 3,746,573 | 7/1973 | Hotta et al. | 117/139.5 |
| 3,917,740 | 11/1975 | Siclari et al. | 260/857 |
| 4,061,811 | 12/1977 | Takase et al. | 428/95 |
| 4,081,579 | 3/1978 | Queen et al. | 428/95 |
| 4,153,749 | 5/1979 | Klein | 428/95 |
| 4,269,881 | 5/1981 | Johnson et al. | 428/95 |
| 4,449,774 | 5/1984 | Takashi et al. | 339/59 |
| 4,526,952 | 7/1985 | Zeitler et al. | 524/496 |
| 4,579,902 | 4/1986 | O'Brien | 524/496 |
| 4,683,158 | 7/1987 | Yasuoka | 428/95 |

*Primary Examiner*—Marion C. McCamish
*Attorney, Agent, or Firm*—Terry T. Moyer; H. William Petry

[57] ABSTRACT

A carpet composite is provided having improved static electricity characteristics which comprises: a surface layer comprised of face yarn, said face yarn being embedded into a backing layer of thermoplastic resin material into which has been incorporated a mixture of carbon black and carbon fibers in an amount sufficient to improve the static electricity characteristics of said carpet composite.

2 Claims, No Drawings

CARPET COMPOSITES, HAVING IMPROVED STATIC ELECTRICITY CHARACTERISTICS

The present invention relates to carpet composites having improved static electricity characteristics. More particularly, the present invention relates to carpet composites having thermoplastic backings which have improved static electricity characteristics which are provided by including into the backing layer or layers a combination of carbon black particles and carbon fibers.

In the past, there have been many efforts directed to reducing the problem of static electricity in carpeting. Generally, these efforts have involved adding conductive material to the face fibers of the carpeting, either as a chemical finish or in the form of discrete conductors such as steel fibers or metalized organic fibers (see U.S. Pat. No. 4,678,675); bonding conductive materials such as aluminum foil to the carpet backing (see U.S. Pat. No. 3,713,960); or applying multiple layers (tufting adhesive, scrimming adhesive, and back size) of conductive latex (see U.S. Pat. No. 3,728,205) to provide a continuous electrical path from the carpet face to its floor-engaging surface. Often, conductive face yarns have been used in conjunction with conductive foils or latex layers to improve the anti-static properties of the face yarns and increase their useful life.

In particular, the need for effective static dissipation is particularly urgent in computer rooms and the like where damage to sensitive equipment may occur. In such applications certain testing procedures have been developed to evaluate the suitability of floor covering products for use in these highly sensitive applications. Thus, while techniques which have previously been suggested for improving the static electricity dissipation characteristics of carpeting have been suitable for many end use applications, the dissipation characteristics for carpeting in these particularly sensitive application areas have not been achieved with state-of-the-art products.

Attempts have been made to meet these requirements by the incorporation of carbon black per se into the backing layers, but in order to achieve or even approach the static electricity dissipation characteristics required, the amount of carbon black that must be incorporated has been generally so high that the viscosity of the liquid thermoplastic resin applied to the backing is so increased that processing of the product becomes difficult or impossible.

According to the present invention, the problems associated with the previously suggested techniques for achieving desired static electricity dissipation characteristics in carpeting products have been overcome and conductivity measurements of about $2\times10^5$ ohms may achieved.

These advantages have been achieved by incorporating into the backing layer or into one or more of the backing layers of a thermoplastic resin backed carpeting, a mixture of from about 0.2% to 0.4% by weight of carbon black having a particle size of from about 15 t.o 30 nanometers and from about 0.4 to 2% by weight of carbon fibers having an average length of from about 0.1 to about 0.2inch, preferably from about 0.12 inch to about 0.18 inch. By means of the incorporation of such a combination of carbon black and carbon fibers, conductivity measurements of about $2\times10^5$ ohms may be achieved.

The carpeting products of the present invention may be described as pile fabrics wherein the bonding of the pile forming yarn to a suitable base layer is accomplished by means of a hot melt adhesive which is a relatively inexpensive and, hence, commercially attractive adhesive system. One particularly desirable technique for bonding the pile forming yarns to the base layer is described in commonly assigned U.S. Pat. No. 4,371,576 to Machell (herein the Machell patent) which describes a technique for making a so called "bonded carpeting". While the present invention certainly has extensive applicability to bonded carpeting products, it may also apply quite advantageously to tufted carpets, that is carpets wherein the pile yarns are tufted through a backing layer and the adhesive is applied to the back of the base layer to adhere the tufted yarns to the base layer. Typically, the hot melt or thermoplastic adhesive is heated to at least its softening point prior to its application to the base layer. It is then allowed to cool to bond the pile forming yarns (both in bonded and tufted configurations) to the base layer.

The yarn used in forming the pile may be made of any type of fiber known to be useful for floor covering products including, for example, nylon, acrylics, polyester, wool, cotton and rayon. According to a preferred embodiment of the present invention, the yarn itself is provided with anti-static characteristics which may be provided either by means of a conventional anti-static finish applied to the yarns or by means of the incorporation into the yarns during their manufacture of conductive metallic or carbon fibers, etc. A wide variety of techniques for imparting anti-static characteristics to the yarns employed in the floor covering products of the present invention will be readily apparent to those having skill in this particular art.

The thermoplastic resin adhesive compositions which may be employed according to the present invention include a wide range of thermoplastic, or so-called hot melt adhesives which have been available for many years. Typically such compositions may have a melt viscosity of less than about 200,000 cps, preferably less than about 100,000 cps at 360° F. Examples include, for instance, blends of ethylene/vinyl ester copolymer, petroleum wax and a thermoplastic resin as disclosed in U.S. Pat. No. 3,551,231. Other suitable blends which may be used include ethylene/vinyl ester copolymer, low molecular weight, low density polyethylene, microcrystalline wax, aliphatic thermoplastic hydrocarbon resin, dicyclopentadiene alkylation polymer, antioxidant and filler as disclosed in U.S. Pat. No. 3,684,600. Other suitable hot melt adhesives of the ethylene/vinyl ester type which may be used are disclosed in U.S. Pat. Nos. 3,583,936, 3,676,280, 3,684,600, 3,745,054, 3,723,371, 3,911,185, 3,914,489 and 4,012,547. Still other hot melt adhesive formulations which may be employed include those of the atactic polypropylene type. In general such compositions may contain a predominant amount, e.g., from about 10 parts to about 100 parts or more, preferably from about 60 parts to 100 parts, by weight atactic polypropylene; from 0 to about 70 parts of another compatible thermoplastic material such as hydrocarbon resins, waxes, polyethylene, especially linear, low density polyethylene; isotactic polypropylene, polyisobutylene and polybutene-1. Fillers in widely varying amounts may be added to such compositions as will be readily apparent to those skilled in the art.

Other compatible thermoplastic materials which may be employed in the adhesive formulation include ethylene/ethyl acrylate, polyacetals, polyesters, polystyrene, polyacrylonitrile, polyacrylic ester, polymethacrylic ester, polyvinyl chloride, polyvinylidene chloride, polyvinyl acetate, polyvinyl acetal, polyvinyl ether, polytetrafluoroethylene, polyamide, coumarone-/indene resins, natural resins, hydrocarbon resin, bitumen and others.

The amount of hot melt adhesive applied may vary widely, based upon the particular pile yarn employed, base layer and properties desired in the pile fabric product. In general the amount employed may be from about 2 to about 200 ounces, preferably about 4 to about 80 ounces per square yard. Tuft binds of carpet yarns that may be achieved according to the invention may be from about 2 to about 20 pounds.

Suitable base layers which may be employed in the product and process of the invention include woven fabrics, knitted fabrics, non-woven scrims, felted materials, or even flexible, foraminous materials.

Where it is desired to provide the hot melt adhesive bonded pile fabrics of the present invention as floor covering products, especially carpet tiles, it may be desirable to apply any of a wide variety of suitable, resilient backing layers to the fabric. Such carpet tiles are also considered to be within the scope of the present invention. The backing layer may be formed, for example, from a suitable thermoplastic material such as blends containing ethylene/vinyl acetate copolymers, atactic polypropylene, bitumen hydrocarbon resins, waxes, synthetic and natural rubbers.

The backing may be bonded to the base layer by means of the same adhesive applied to the base layer to bond the pile fabrics. Thus, the resulting product may have fewer separate layers subject to separation than known carpet tiles. This is, rather than having pile layer, adhesive layer, base layer, another adhesive layer and backing layer, the present carpet tile may typically have a pile layer; a single, integral, hot melt adhesive layer into which the base layer may be disposed or suspended, and a backing layer bonded to the composite by means of the hot melt adhesive. The backing layer may be provided with at least one stiffening and stabilizing membrane, such as woven or nonwoven glass fibers.

The particular carbonaceous material employed in the process of the present invention is a combination of carbon black and carbon fibers. The carbon fibers to be used may be designated as generally carbonaceous or graphite fibers having certain conductivity characteristics. Examples include those produced from pitch-based fibers as well as those produced by carbonizing polyacrylonitrile fibers, or lignin fibers. The length of the carbon fibers to be used according to the present invention have an average fiber length of from about 0.1 to about 0.2 inch, preferably from about 0.12 inch to about 0.18 inch. If the fibers exceed about 0.2 inch in average length it may be difficult to disperse them uniformly in a thermoplastic backing layer. If the fibers have an average of less than about 0.1 inch the electrical dissipation characteristics of the carpeting may not be satisfactory.

Carbon blacks which are useful in the preparation of the floor covering products of the present invention in general may be characterized as having an average particle size of less than about 50 nanometers, preferably from about 15 to 30 nanometers. The carbon black particles may be further characterized as having an average surface area of from about 800 to about 1500 square meters per gram, pore volume of from about 300 to about 500 milliliters per 100 grams and apparent bulk density of from 5 to 10 pounds per cubic foot. Commercially available products which have been found to be suitable for use in the products of the invention are marketed, for example, under EC-600JD Ketjenblack manufactured by Akzo Chemie, America.

According to the present invention, the carbon black and carbon fibers are each incorporated into the backing layer in an amount sufficient to improve static electricity characteristics. Preferably, the carbon black is incorporated into the backing layer or into one or more of the backing layers if there are multiple backing layers in an amount of from about 0.2 to about 0.4% by weight based upon the weight of the thermoplastic backing layer and the carbon fibers are incorporated in an amount of about 0.4 to 2% by weight based upon the weight of the thermoplastic backing layer. Floor covering products may be made by incorporating one, two or even more thermoplastic backing layers onto the floor covering product in order to achieve desired properties for a particular end use application. Thus, for instance, where a carpet tile product is desired the yarns will typically be bonded to the composite by means of a thermoplastic adhesive which is typically provided in an amount of from about 20 to 80 ounces per square yard. The adhesive is typically filled and may contain, in addition to any such fillers, the carbonaceous composition as described above. The next layer that is typically provided in a carpet tile type floor covering product which is the preferred embodiment of the present invention is identified as a tie-coat layer. This layer is typically a rather highly filled thermoplastic material. Additional layers of thermoplastic material which may be interposed with stabilizing layers of, for instance, non-woven glass may also be provided.

According to the broadest aspects of the present inventions, the carbonaceous material will be provided in at least one of the backing layers although several layers and, indeed, according to a preferred embodiment, all of the backing layers may be provided with the recited range, based upon the weight of the individual layer, of the carbonaceous material. Such may be desired, in particular, because it may be advantageous to reduce the resistivity of the floor covering product throughout the cross-sectional dimension of the product, that is from the surface of the product where the tips of the pile yarns appear all the way through to the back surface of the floor covering product which is in contact with the substrate surface.

It has been found, in particular, that the carbonaceous material should be a combination of both carbon black and carbon fibers. This combination of materials has been found to provide certain unexpected and surprising advantages over the use of either material alone. In particular, it has been found, as will be pointed out in more detail in the following examples, that the incorporation of 100% carbon black having an average size of, say, 30 nanometers into a thermoplastic backing layer tends to increase the relative viscosity of the thermoplastic layer to a level such that processing of the product becomes difficult or impossible. The use of carbon fibers exclusively in the thermoplastic backing layer has been found to be insufficient to achieve the desired electrical conductivity dissipation characteristics in the floor covering product.

The invention may be further understood by reference to the following examples which are illustrative only and which are not to be construed as limiting the subject matter of the present invention which is defined in the claims appended hereto. Unless otherwise indicated all parts and percentages are by weight.

TEST METHODS

While the demands of individual customers for electronic equipment compatible carpet modules may vary considerably, three tests are currently being used in the United States, Europe and Japan to characterize the suitability of floor covering products for use in association with electronic office devices and computers. It is to be understood that these tests are typically performed on floor covering products that have been "preconditioned" at 20% relative humidity and 70° F.

The Static Generation Test

The Static Generation Test, sometimes referred to as the "stroll" test is described in AATCC Test Method 134-1986. This test consists of an individual walking back and forth at an even pace on conditioned carpeting while holding an electrode attached to a voltage measuring device. The test is conducted with three different types of shoe soles, namely leather, rubber and composition. The average of the maximum voltage peaks is an indication of the propensity of the carpet to generate static. In general, the objectives for this test are a maximum of 2.0 KV with Neolight soles and a maximum of 1.0 KV with leather sole shoes.

The Resistivity Test

The Resistivity Test sometimes known in the industry as the IBM Resistivity Test measures the resistance between the face of the carpeting and the back by applying a prescribed 500 volt charge to a 2.5 inch diameter electrode weighing 5 pounds. The resistance is determined by measuring the current that is passed through the carpeting and the value is calculated using ohms law. Objectives for this test are as follows:

Maximum of $10^8$ ohms, Face to Ground
Maximum of $10^8$ ohms, Face to Face
Minimum of $1.5\times10^5$ ohms, Face to Face
Maximum of $10^8$ ohms per square

The Static Decay Test

The Static Decay Test is described in NFPA 56A and is used to determine the ability of a floor covering product to dissipate a static charge. A test sample is first charged to a potential of 5000 volts. The bracket holding the test sample is then suddenly grounded and the decay in voltage is monitored with a sensitive electrometer. The time required for the carpet sample to discharge is a measure of static decay.

Objectives for this test are as follows:
Maximum decay time of 0.5 sec. for a voltage decrease of 5 to 0.5 KV.

EXAMPLE 1

A hot melt adhesive backed carpet tile product was manufactured using the apparatus and procedure generally described in U.S. Pat. No. 4,371,576 (incorporated by reference). The nylon yarn employed was a spun yarn containing a blend of a metalized organic fiber. The yarn was bonded by means of a hot melt adhesive which contained 0.5% carbon fibers having an average length of about ⅛ of an inch and 0.3% carbon black particles having an average particle size of about 15 nanometers, surface area of 1250 square meters per gram, a pore volume of 495 milliliters per 100 grams and an apparent bulk density of 7.2 pounds per cubic foot. The hot melt adhesive was forced through a liquid permeable base layer into contact with the nylon yarn and the adhesive was applied in an amount of about 40 ounces per square yard. A thermoplastic hot melt adhesive tie-coat layer was employed (25 ounces per square yard) to join the bonded carpet to a thermoplastic backing layer weighing about 50 ounces per square yard. In addition to the hot melt adhesive layer, the backing and tie-coat layers also contained 0.5% carbon fibers and 0.3% carbon black as described above. The carpeting product continued to exhibit all of the desirable physical properties necessary for a suitable floor tile product and, in addition, exhibited improved anti-static properties as summarized below:

| Test Results: | | |
|---|---|---|
| Static Generation "Stroll" | | −0.4 KV Leather |
| | | −1.5 KV Neolite |
| Resistance | $5 \times 10^6$ | Ohms Face to Ground |
| | $1 \times 10^8$ | Ohms Face to Face |
| | $2.4 \times 10^6$ | Ohms per Square |
| Static Decay | 5000 volts to zero in less than 0.01 sec. | |

EXAMPLE 2

In this example a "control" carpet tile product was manufactured using the same general procedure described above but eliminating the use of the metalized fiber as well as the use of the carbonaceous materials in the various layers as described in Example 1 above. The anti-static properties, summarized below, would render the carpeting inferior to the product described above in Example 1 for use in connection with applications where sensitive, electrical and computer equipment may be affected:

| | | |
|---|---|---|
| Static Generation "Stroll" | | −0.8 KV Leather |
| | | −2.8 KV Neolite |
| Resistance | $3 \times 10^{10}$ | Ohms Face to Ground |
| | $1.3 \times 10^{11}$ | Ohms Face to Face |
| | $1.3 \times 10^{15}$ | Ohms per Square |
| Static Decay | Decay | 10.0 sec. |

EXAMPLE 3

In this example, certain "laboratory mixes" were prepared containing approximately 35% by weight of a thermoplastic resin typically employed in the manufacture of hot melt adhesive backed carpet tiles. In addition, these mixes also contained varying amounts of carbon fiber, carbon black and fillers as summarized in the following table. The resistance test was employed to measure the suitability for such mixes in the manufacture of floor covering products having desired anti-static characteristics and it can be seen by reference to the following table that where, for instance, carbon fiber is eliminated from the mix or where the amount of either the carbon fiber or carbon black is outside of the recited range for the carpet tile products of the present invention, the resistance measurements are in excess for the maximum acceptable values desired in carpeting products used in areas where sensitive, electronic or computer equipment may be located.

| Thermoplastic Resin | Carbon Fiber | Carbon Black | Fillers | Resistance Ohms |
|---|---|---|---|---|
| 35% | .4 | .2 | 64.4 | $1.5 \times 10^{12}$ |
| 35% | .2 | .2 | 64.6 | $1.5 \times 10^{12}$ |
| 35% | .7 | .2 | 64.1 | $2.0^{7}$ |
| 35% | .4 | .3 | 64.3 | $1.0^{6}$ |
| 35% | .3 | .3 | 64.4 | $3.0^{8}$ |
| 35%** | .5 | .5 | 64 | $8.0^{5}$ |
| 35%** | .5 | .4 | 64.1 | $1.0^{5}$ |
| 35% | .5 | .3 | 64.2 | $1.0^{6}$ |
| 35% | 0 | .3 | 64.7 | $1.5^{11}$ |

**Increase in viscosity of liquid thermoplastic resin

What is claimed is:

1. A carpet composite having improved static electricity characteristics which comprises: a surface layer comprised of face yarn, said face yarn having been embedded into a backing layer of thermoplastic resin material into which has been uniformly incorporated throughout the entire cross sectional dimension of said backing layer a mixture of from about 0.2 to about 0.4 percent by weight based upon the total weight of the thermoplastic resin backing layer of carbon black particles having an average particle size of from about 15 to about 30 nanometers, and from about 0.4 to about 2 percent by weight based upon the weight of the thermoplastic resin backing layer of carbon fibers having an average length of from about 0.1 to about 0.2 inch.

2. The carpet composite of claim 1 wherein said face yarn is provided with anti-static characteristics.

* * * * *